(12) United States Patent
Reese et al.

(10) Patent No.: US 11,660,565 B2
(45) Date of Patent: May 30, 2023

(54) COMPACT MEMBRANE MODULE SYSTEM FOR GAS SEPARATION

(71) Applicant: Generan IGS, Inc., Houston, TX (US)

(72) Inventors: Steven Reese, Humble, TX (US); Marc Straub, Brentwood, CA (US); John A. Jensvold, Benicia, CA (US); Robert Kociolek, Benicia, CA (US)

(73) Assignee: Generon IGS, Inc., Houston, TX (US)

( * ) Notice: Subject to any disclaimer, the term of this patent is extended or adjusted under 35 U.S.C. 154(b) by 298 days.

(21) Appl. No.: 17/070,661

(22) Filed: Oct. 14, 2020

(65) Prior Publication Data

US 2021/0023500 A1 Jan. 28, 2021

Related U.S. Application Data

(63) Continuation-in-part of application No. 16/158,626, filed on Oct. 12, 2018, now Pat. No. 10,843,127.

(60) Provisional application No. 62/586,308, filed on Nov. 15, 2017.

(51) Int. Cl.
*B01D 53/22* (2006.01)
*B01D 63/06* (2006.01)

(52) U.S. Cl.
CPC ......... *B01D 53/226* (2013.01); *B01D 53/227* (2013.01); *B01D 63/06* (2013.01); *B01D 2053/221* (2013.01); *B01D 2313/105* (2013.01); *B01D 2313/125* (2013.01); *B01D 2313/18* (2013.01)

(58) Field of Classification Search
None
See application file for complete search history.

(56) References Cited

U.S. PATENT DOCUMENTS

| | | | | |
|---|---|---|---|---|
| 1,063,926 | A * | 6/1913 | Schuermann | ........... F16L 19/10 |
| | | | | 285/382.7 |
| 4,881,953 | A | 11/1989 | Prasad | |
| 7,497,894 | B2 | 3/2009 | Jeffers | |
| 7,517,388 | B2 | 4/2009 | Jensvold | |
| 7,578,871 | B2 | 8/2009 | Jensvold | |

(Continued)

FOREIGN PATENT DOCUMENTS

| | | |
|---|---|---|
| EP | 1857166 A1 | 11/2007 |
| EP | 2208522 A1 | 7/2010 |

(Continued)

*Primary Examiner* — Jason M Greene
(74) *Attorney, Agent, or Firm* — William H. Eilberg

(57) ABSTRACT

A device for separating a gas, such as air, into components, includes a plurality of modules, each module having one or more polymeric membranes capable of gas separation. A set of valves, pipes, and manifolds together arrange the modules in one of two possible configurations. In a first configuration, the modules are arranged in parallel. In a second configuration, the modules are divided into two groups which are arranged in series. The device can be switched from parallel to series, or from series to parallel, simply by changing the positions of a small number of valves, typically three valves. The device can therefore produce gas either of higher purity, or moderate purity, depending on the settings of the valves. The device also includes improved structures for connecting the modules to inlet and outlet manifolds, and also includes devices for temporarily isolating one or more modules from the system.

21 Claims, 10 Drawing Sheets

(56) References Cited

U.S. PATENT DOCUMENTS

| 7,662,333 B2 | 2/2010 | Coan |
| 2003/0111402 A1 | 6/2003 | Baig |
| 2007/0107596 A1 | 5/2007 | Wynn |
| 2015/0068970 A1* | 3/2015 | Cho .................. B01D 63/12 |
| | | 210/323.1 |
| 2016/0375410 A1 | 12/2016 | Berchtold |

FOREIGN PATENT DOCUMENTS

| EP | 2514499 A1 | 10/2012 | |
| JP | 2013-17939 * | 1/2013 | ............. B01D 53/22 |
| JP | 2013-17939 A | 1/2013 | |

\* cited by examiner

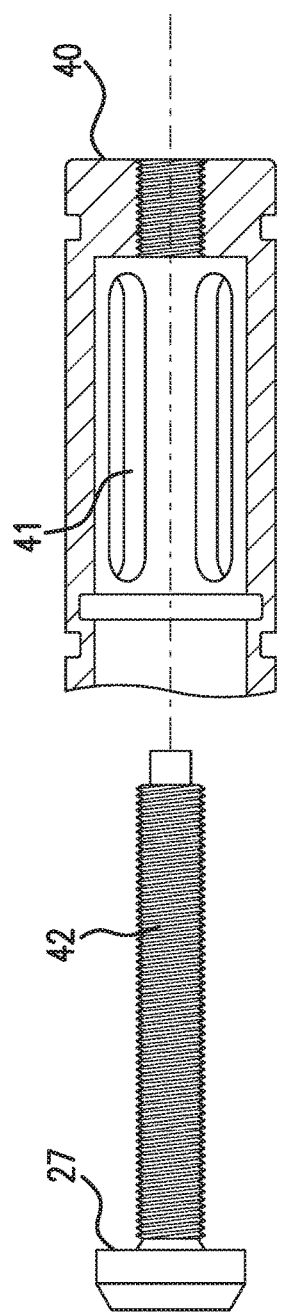
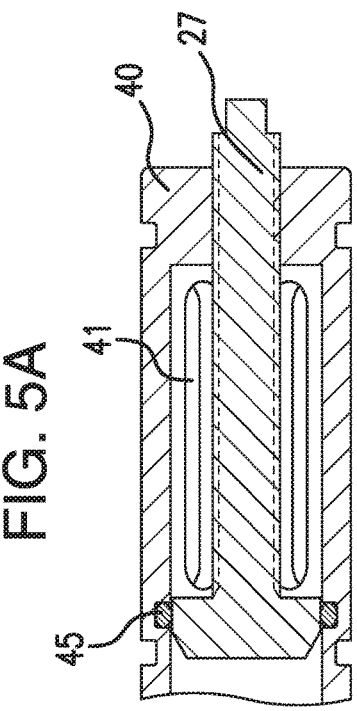
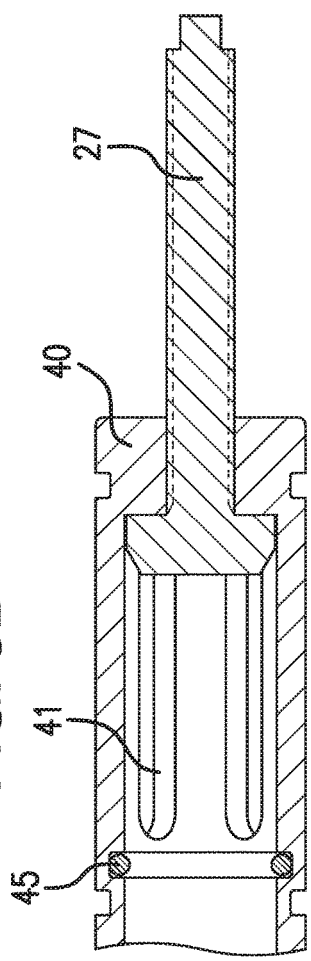
FIG. 5A
FIG. 5B
FIG. 5C

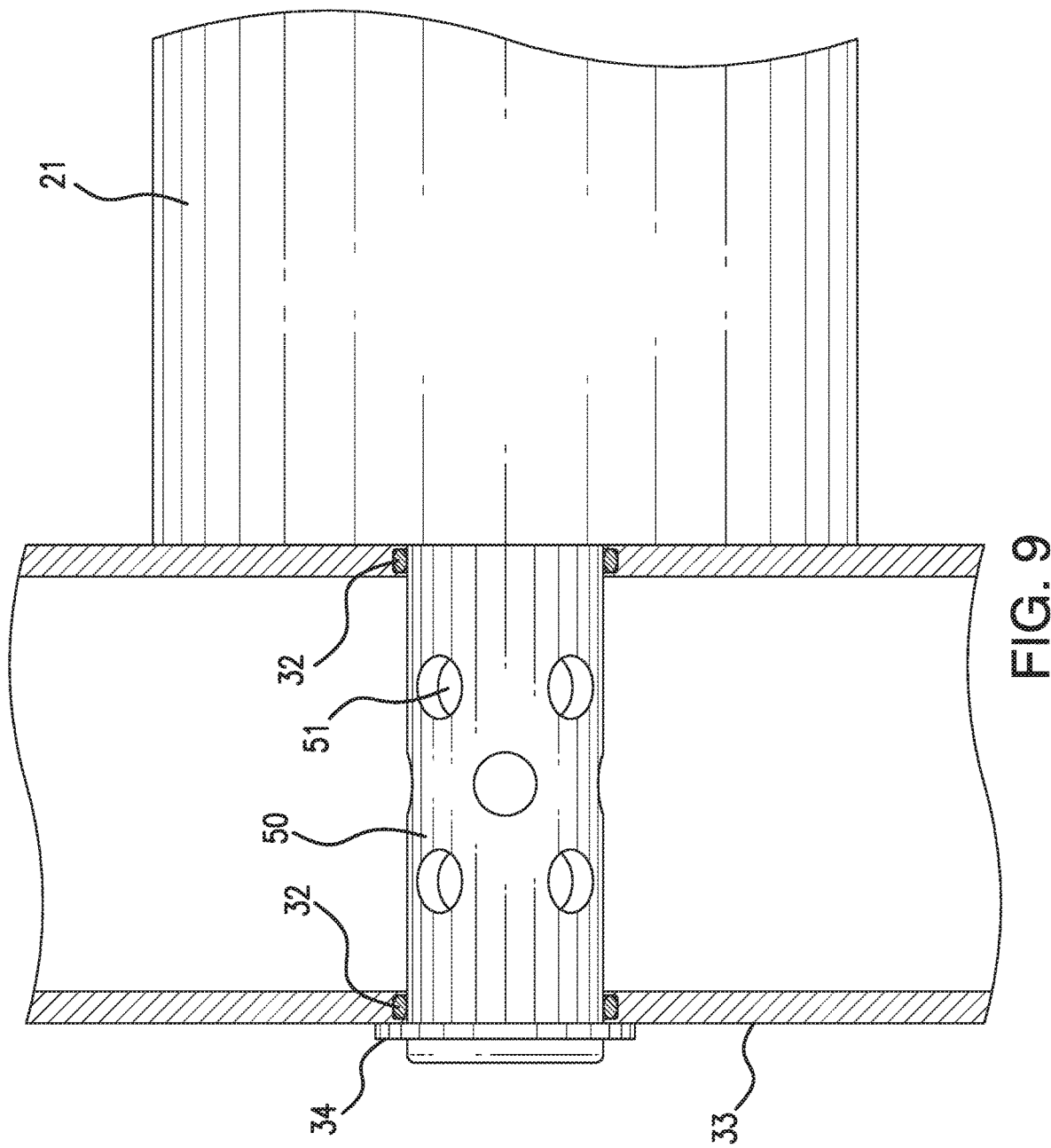

COMPACT MEMBRANE MODULE SYSTEM FOR GAS SEPARATION

CROSS-REFERENCE TO RELATED APPLICATION

This is a continuation-in-part of U.S. patent application Ser. No. 16/158,626, filed Oct. 12, 2018, which claims the priority of U.S. provisional patent application Ser. No. 62/586,308, filed Nov. 15, 2017. The entire disclosures of the above-cited applications are hereby incorporated by reference.

BACKGROUND OF THE INVENTION

The present invention relates to the separation of gas into components using polymeric membranes.

It has been known to use a polymeric membrane to separate air into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" or "retentate" gas. The selectivity of the membrane is a measure of the degree to which the membrane allows one component, but not the other, to pass through.

A membrane-based gas separation system has the inherent advantage that the system does not require the transportation, storage, and handling of cryogenic liquids. Also, a membrane system requires relatively little energy. The membrane itself has no moving parts; the only moving part in the overall membrane system is usually the compressor which provides the gas to be fed to the membrane.

A gas separation membrane unit is typically provided in the form of a module containing a large number of small, hollow fibers made of the selected polymeric membrane material. The module is generally cylindrical, and terminates in a pair of tubesheets which anchor the hollow fibers. The tubesheets are impervious to gas. The fibers are mounted so as to extend through the tubesheets, so that gas flowing through the interior of the fibers (known in the art as the bore side) can effectively bypass the tubesheets. But gas flowing in the region external to the fibers (known as the shell side) cannot pass through the tubesheets.

In operation, a gas is introduced into a membrane module, the gas being directed to flow through the bore side of the fibers. One component of the gas permeates through the fiber walls, and emerges on the shell side of the fibers, while the other, non-permeate, component tends to flow straight through the bores of the fibers. The non-permeate component comprises a product stream that emerges from the bore sides of the fibers at the outlet end of the module.

Alternatively, the gas can be introduced from the shell side of the module. In this case, the permeate is withdrawn from the bore side, and the non-permeate is taken from the shell side.

An example of a membrane-based air separation system is given in U.S. Pat. No. 4,881,953, the disclosure of which is incorporated by reference herein.

Other examples of fiber membrane modules are given in U.S. Pat. Nos. 7,497,894, 7,517,388, 7,578,871, and 7,662,333, the disclosures of which are all hereby incorporated by reference.

One application of the above-described technology is the production of nitrogen. Sometimes it is necessary to produce high purity nitrogen, defined as having a purity of up to 99.99%. In other situations, nitrogen of only moderate purity, defined as a purity of 99% or less, is needed.

In producing moderate purity nitrogen, one typically provides a plurality of membrane modules arranged in a parallel array, so that all the modules receive the same feed gas, usually compressed air, and all of the modules discharge to a common output stream. In producing high purity nitrogen, the modules are instead arranged in series, such that the first set of modules receives a raw feed gas, such as compressed air, and such that the product of the first set comprises the feed gas for the second set of modules. The output of the second set of modules is the high purity nitrogen stream.

The systems of the prior art can produce either moderate purity nitrogen, or high purity nitrogen, but not both. A prior art system either comprises a plurality of modules in parallel, or it comprises sets of modules arranged in series. Moreover, the series arrangement typically occupies considerably more space than does the set of parallel modules, because of the need to provide distinct stages which are separate from each other, each stage having its own housing.

The present invention provides an apparatus, disposed in a single housing, wherein the apparatus can be easily configured for series or parallel operation, simply by changing the settings of a few valves. Thus the device of the present invention provides greater flexibility of operation, and reduces the space occupied by, and the weight of, the system, while minimizing production costs associated with auxiliary piping and valves.

SUMMARY OF THE INVENTION

The present invention comprises a set of membrane modules, connected by appropriate conduits and valves, wherein the set of modules can be configured either as a plurality of modules connected in series, or as a plurality of modules connected in parallel. The configuration can be changed simply by changing the positions of a few valves. Thus, the same device can be used to produce a gas of moderate purity, or a gas of high purity, depending only on the setting of the valves.

In the preferred embodiment, a plurality of membrane modules are connected to inlet manifolds and outlet manifolds, the manifolds being connected to external pipes, the flow of gas in some of the pipes being allowed or blocked by valves installed in such pipes.

In a configuration in which the modules are all arranged in parallel, the feed gas is directed through the inlet manifolds, and conveyed simultaneously into all of the modules. The output of the modules is collected by the outlet manifolds, which convey the product gas through an external pipe to an outlet port.

In a configuration in which the modules are effectively arranged in series, the feed gas is directed, due to the setting of the external valves, into only some, preferably half, of the modules in the set. The product gas of these modules is directed, again due to the setting of the valves, back to inlet manifolds connected to the modules which did not receive the initial flow of gas. The product gas from this second group of modules is then collected by outlet manifolds, and conveyed through an external pipe to the outlet port.

Thus, in the latter configuration, although the modules occupy the same physical space, and are not moved, they function either as one larger set of modules connected in parallel, or two smaller sets of modules arranged in series, based only upon the change of the positions of the valves. In switching between series and parallel modes, one does not move the modules, and one does not make any changes other than to change the positions of the valves.

The present invention therefore saves substantial space and weight, by using a single group of modules, contained in a single housing, for both parallel and series operation.

The invention also includes an improved structure for connecting the modules to an inlet or outlet manifold. The modules are connected, at their inlet and outlet ends, to a slotted or perforated pipe, the pipe extending into the manifold. Gas flowing in the manifold can reach the module by flowing through the slots or holes and then into the module. Gas flows out of the module by passing into the pipe, and then flowing through the slots and into the manifold.

The invention also includes a device for isolating one or more modules, when it is desired to remove a module from the system. In one embodiment, a plunger blocks gas flow into or out of a slotted pipe. In an open position, the plunger allows gas to flow freely. In a closed position, the plunger blocks such flow. By blocking gas flow at both inlet and outlet ends of the module, one can effectively remove that module from the system.

The present invention therefore has the primary object of providing a set of modules which can be configured in a series or parallel configuration, simply by changing the positions of a small number of valves.

The invention has the further object of reducing the volume occupied by a membrane module system, while maintaining the flexibility of the system to operate in either a series or parallel mode.

The invention has the further object of providing a membrane-based gas-separation system which can be easily configured to provide either a moderate purity product gas, or a high purity product gas, simply by changing the positions of a small number of valves.

The invention has the further object of reducing the weight of a membrane-based gas-separation system.

The invention has the further object of reducing the cost of acquisition and operation of a membrane-based gas-separation system.

The invention has the further object of facilitating the production of either moderate purity nitrogen, or high purity nitrogen, using a set of gas-separation membrane modules contained in a single housing.

The invention has the further object of facilitating the connection of gas separation modules to inlet and outlet manifolds, by providing slotted or perforated pipes, each of which provides a path for gas flowing between a module and a manifold.

The invention has the further object of making it easy to remove one or more modules from the system, by temporarily blocking the flow of gas at the inlet and outlet ends of a module.

The reader skilled in the art will recognize other objects and advantages of the present invention, from a reading of the following brief description of the drawings, and the detailed description of the invention.

BRIEF DESCRIPTION OF THE DRAWINGS

FIGS. 5A-5C provide cross-sectional views of an alternative embodiment in which a plunger permits or blocks gas flow to or from a slotted pipe connected to a module.

FIG. 9 provides a fragmentary elevational view, partly in cross-section, showing a pipe within a manifold, the pipe being connected to a module, the pipe having circular holes.

DETAILED DESCRIPTION OF THE INVENTION

The present invention comprises an apparatus having a plurality of membrane modules, wherein the apparatus has a first configuration in which the modules are all operated in parallel, and a second configuration in which the modules comprise two groups which are effectively arranged in series. The configuration of the apparatus can be changed simply by changing the position of a small number of valves, typically three valves.

The parallel configuration is used to produce a gas having moderate purity, and the series configuration is used to produce a gas having high purity.

In brief, when the system is operated in the parallel mode, the feed gas is distributed among all of the modules, and passes through the modules simultaneously. When the system is operated in the series mode, the feed gas is directed into some, but not all, of the modules, and the product of said modules is then directed into some or all of the remaining modules, i.e. those modules that did not receive the initial feed gas.

The following description of the invention will use, as an example, the case wherein the gas being separated is air, and wherein the product gas is nitrogen, which is recovered as a retentate stream. However, the invention can be practiced with other gases, and could be implemented such that the product gas is the permeate and not the retentate, without departing from the spirit of the invention.

Figure 1:
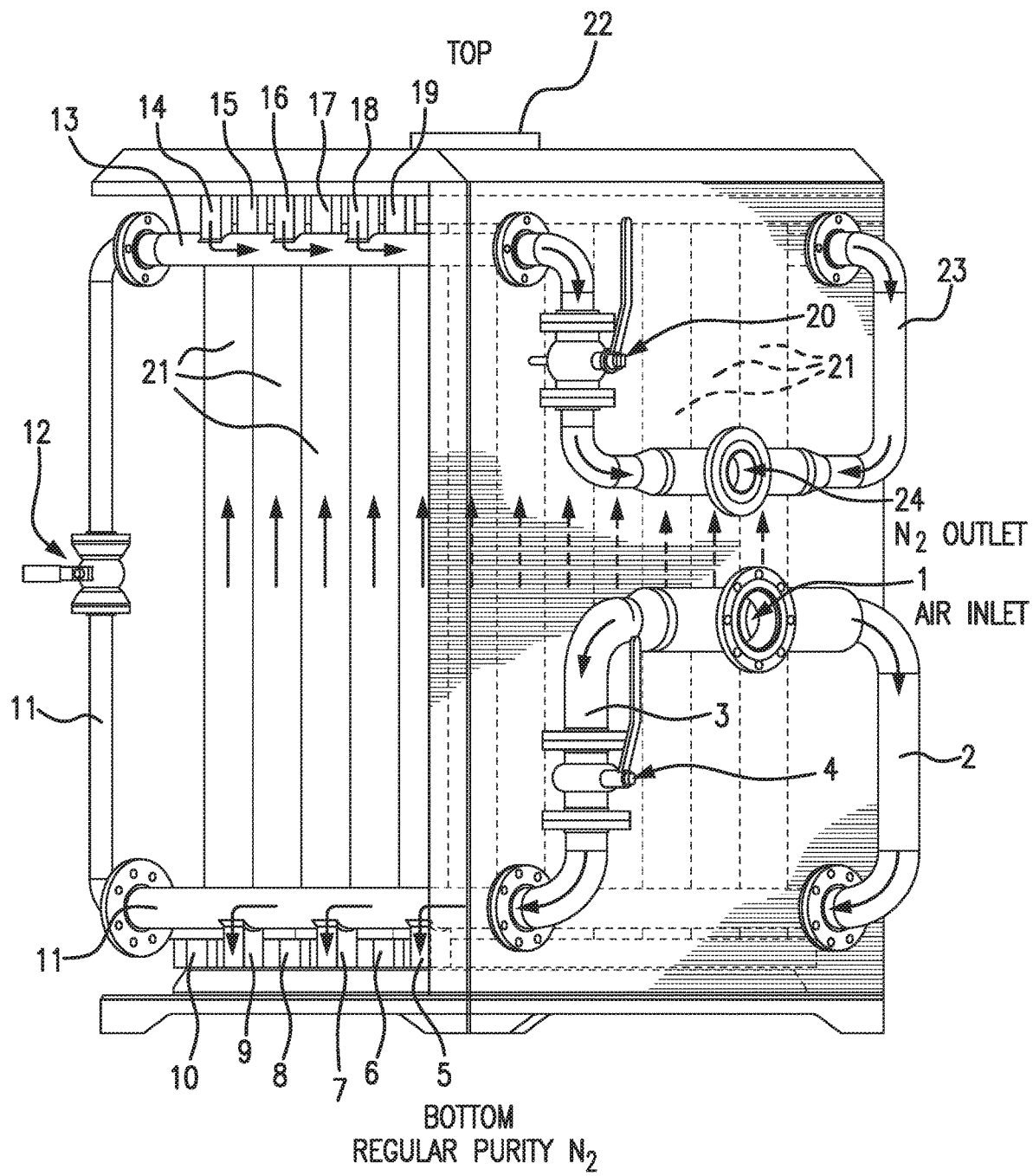
FIG. 1 provides an elevational view of a set of membrane modules, made according to the present invention, having valves and piping set to configure the device for production of nitrogen of moderate purity.

FIG. 1 shows the apparatus of the present invention, in the configuration wherein all of the modules are arranged in parallel. The modules 21 are arranged in a plurality of rows. In the embodiment shown, there are six rows, each row containing six modules. Other arrangements could be used instead, within the scope of the invention. The internal structure of the modules does not form part of the present invention; the modules can be made according to the prior art cited above, or in other ways.

The three control valves are valves 4, 12, and 20. In the drawings, when a valve handle is generally parallel to its associated conduit, the valve is open, and gas can flow through the conduit. When the valve handle is generally perpendicular to the conduit, the valve is closed, and no gas can flow through the conduit.

Air to be separated enters air inlet 1, communicating with pipes 2, 3 and 11 which are external to the set of modules 21. Another pipe, corresponding to pipe 11, is located on the side of the set of modules which is not visible in the figure. But it is understood that such pipe is connected to pipe 2. The pipes 2 and 11 convey air to manifolds 5, 6, 7, 8, 9, and 10, which manifolds are located at the bottom of the various modules 21.

The manifolds 5-10 are staggered, such that pipe 2 conveys gas (air) to manifolds 6, 8, and 10, and pipe 11 conveys gas to manifolds 5, 7, and 9. Although the connection between pipe 2 and manifolds 6, 8, and 10 is in a region that is obscured in the view of FIG. 1, the fluid connection is essentially the same as the connection between pipe 11 and manifolds 5, 7, and 9.

The modules are arranged in a series of rows, and each row can have any number of modules sharing the same inlet row manifold. In the example given in FIGS. 1 and 2, and in the top view of FIG. 3, there are six modules in each row.

The product (retentate) gas produced by the modules flows into manifolds 14, 15, 16, 17, 18, and 19, located at the top of the set of modules in FIG. 1. These manifolds are also staggered, similar to the manifolds at the bottom of the set of modules. Thus, manifolds 14, 16, and 18 collect the outlet gas from the modules, for their respective rows, and discharge the gas into pipe 13. Manifolds 15, 17, and 19 discharge into pipe 30, on the opposite side of the set of modules, pipe 30 not being visible in FIG. 1, but being visible in the top view of FIG. 3. Pipe 30 connects to pipe 23, as shown in FIG. 3.

More particularly, modules in the row connected with inlet row manifold 5 discharge into outlet manifold 19. Modules connected with inlet row manifold 6 discharge into outlet manifold 18. Modules connected with inlet row manifold 7 discharge into outlet manifold 17. Modules connected with inlet row manifold 7 discharge into outlet manifold 17. Modules connected with inlet row manifold 8 discharge into outlet manifold 16. Modules connected with inlet row manifold 9 discharge into outlet manifold 15. And modules connected with inlet row manifold 10 discharge into outlet manifold 14.

Figure 3:
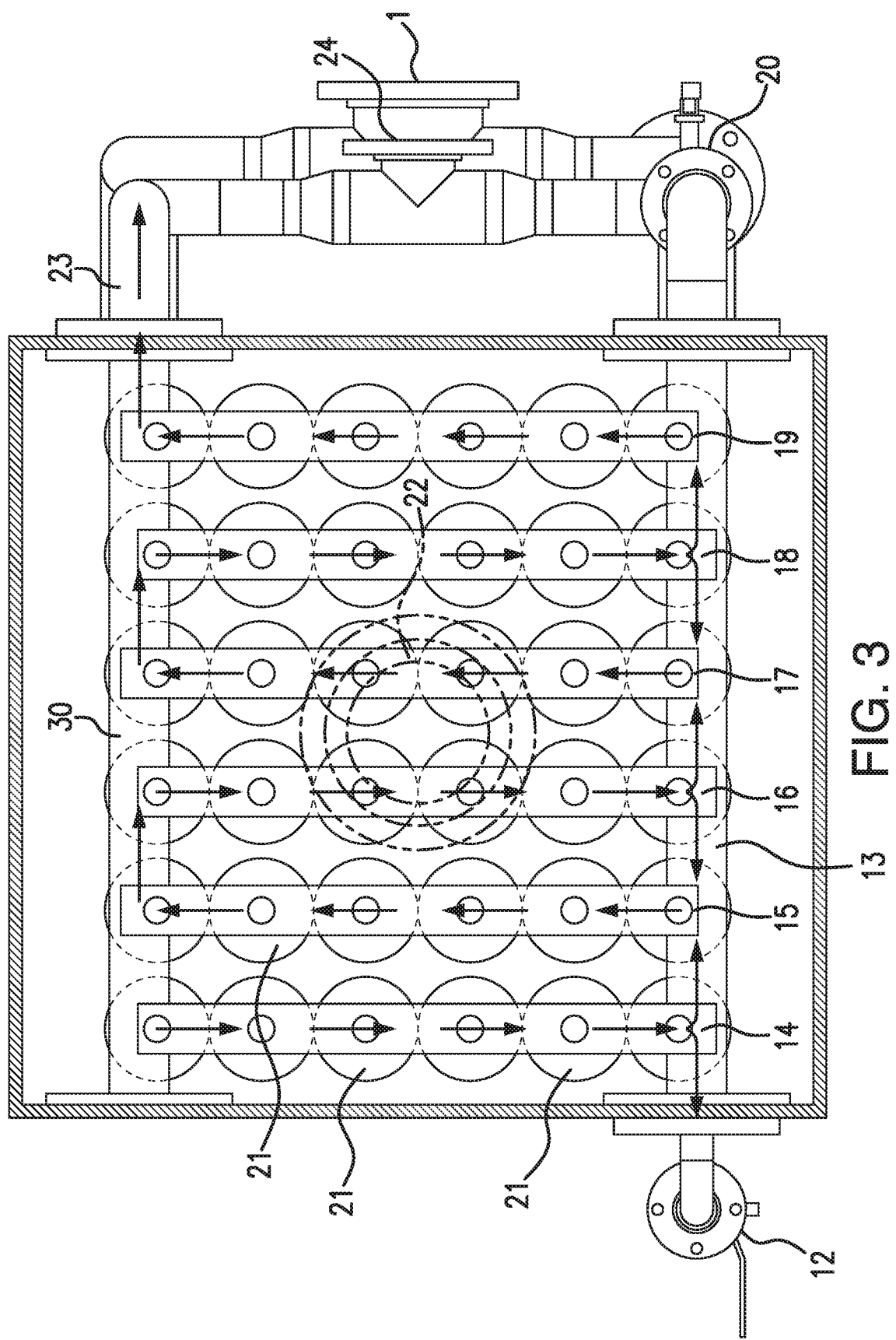
FIG. 3 provides a top view, partly broken away, of the device of FIGS. 1 and 2.

Outlet manifolds 14, 16, and 18 discharge into pipe 13, while outlet manifolds 15, 17, and 19 discharge into pipe 30, visible in FIG. 3, which is fluidly connected to pipe 23. Pipe 23 connects with the nitrogen outlet port 24 in all configurations. Pipe 13 collects gas that can either be directed to port 24 or released through valve 12 to enter pipe 11, depending on the positions of the valves, as will be shown later.

The individual modules take in feed gas, which is air in the present example. The modules produce a permeate stream which is oxygen-rich, relative to the feed stream, at low pressure. The permeate stream flows into the spaces around the modules, and this permeate gas is vented through port 22 at the top of the system. Fans (not shown) may be used at or near port 22 to facilitate the removal of the permeate gas. The non-permeate gas, i.e. the gas which does not pass through the membranes, is the retentate stream, which in the present example is the product gas, a nitrogen-enriched stream. The retentate is discharged into the upper outlet row manifolds.

In the configuration represented in FIG. 1, valve 4 is open, so gas (air) can flow freely, through pipes 2 and 3, to all of the bottom manifolds 5-10, and such gas passes upward through all of the modules, as indicated by the arrows. Gas cannot flow beyond pipe 11, because valve 12 is closed.

Because valve 20 is open, and valve 12 is closed, gas in pipe 13 is forced to flow to the nitrogen outlet 24. Similarly, gas in pipe 30, visible only in FIG. 3, on the opposite side of the set of modules, must flow into pipe 23, and then to the nitrogen outlet 24. Waste gas, which in this example is permeate oxygen, exits the system at vent 22.

One can therefore see that in the configuration of FIG. 1, all of the modules are effectively arranged and operated in parallel. That is, the incoming air is directed to all of the modules, and divided among those modules. The product gases of the modules are collected at the top section, and together comprise an output stream. In the example of air separation, this output stream is nitrogen of moderate purity.

Figure 2:
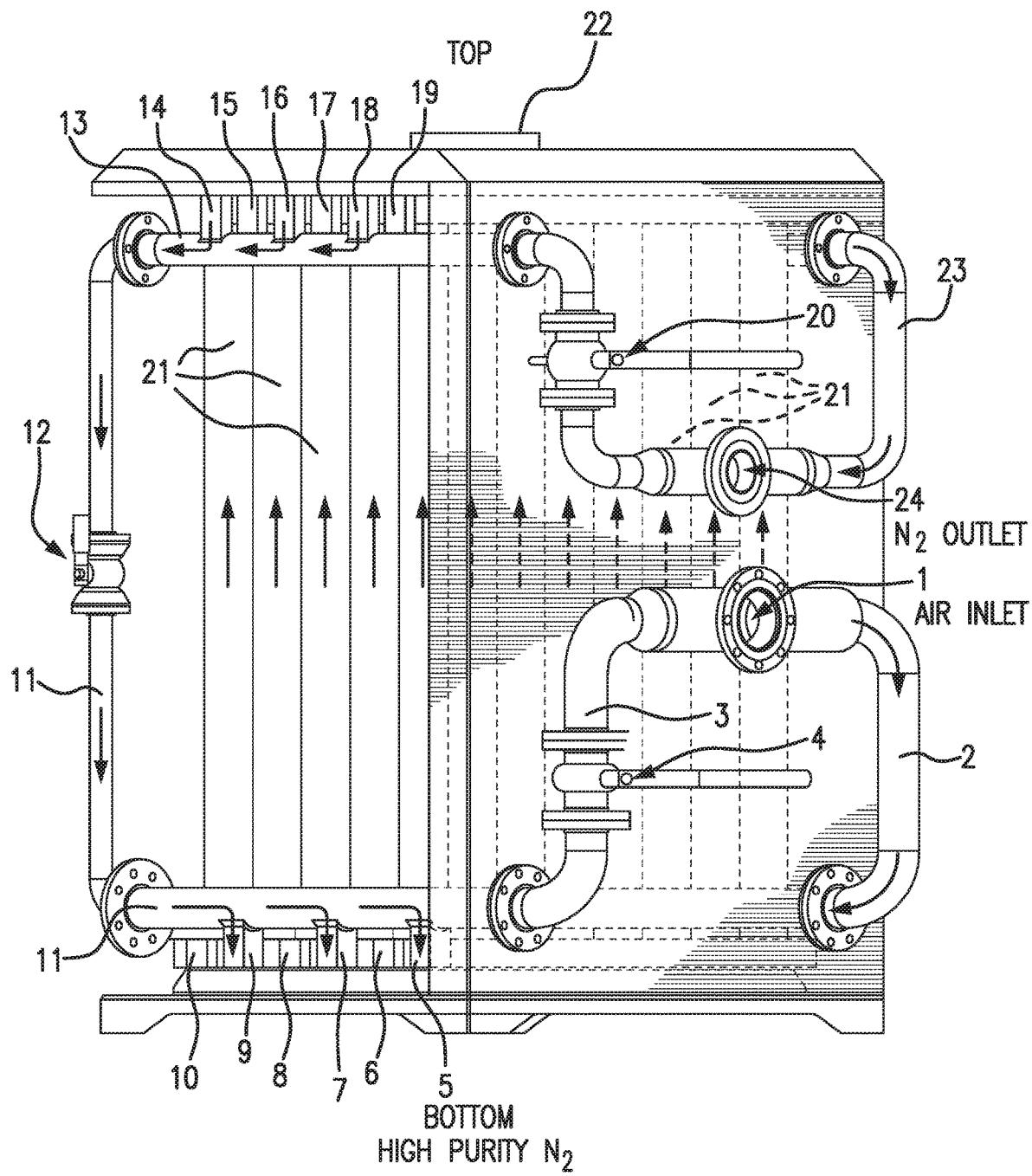
FIG. 2 provides an elevational view of the device of FIG. 1, but in which the valves are set to configure the device for production of nitrogen of high purity.

FIG. 2 illustrates the configuration wherein there are effectively two groups of modules operating in series. Note that, in FIG. 2, the positions of the three valves have been changed. That is, valve 4 is now closed, valve 12 is now open, and valve 20 is now closed.

Air enters through air inlet 1. But because valve 4 is closed, no air from the inlet 1 can flow into pipe 11. Instead, all the air from the inlet flows through pipe 2, into the pipe corresponding to pipe 11 (not visible in the figure), on the far side of the set of modules, and into manifolds 6, 8, and 10. The air therefore flows into every other module, i.e. only those modules which are connected to manifolds 6, 8, and 10. Thus, in this arrangement, the air initially flows into approximately one-half of the modules, and is prevented from entering the remaining modules.

The product gas (the retentate nitrogen-enriched stream), from the modules which received the initial air stream, flows into manifolds 14, 16, and 18, which connect to pipe 13. Because valve 20 is closed and valve 12 is open, this stream flows downward, as shown in FIG. 2, through pipe 11, and then into manifolds 5, 7, and 9. The latter manifolds are in fluid connection with the modules which did not receive the original feed stream. The gas then flows upward through these modules. Because the gas entering these modules, as an input stream, is already nitrogen-enriched, the product retentate gas will be nitrogen of even higher purity. The output of these modules flows out through outlet row manifolds 15, 17, and 19, and then flows into pipe 30 (visible only in FIG. 3) and pipe 23, and to nitrogen outlet 24. The waste gas (permeate) exits through vent 22. The output retentate gas is therefore nitrogen of high purity.

Thus, in the arrangement of FIG. 2, the modules are effectively divided into two groups having approximately equal numbers of modules, and the feed gas is conveyed first through one group of modules, and the product gas so produced is then conveyed through the other group of modules. Thus, the two groups of modules are effectively arranged in series, even though they are physically disposed within the same housing, and even though they are interleaved with each other.

Each row of modules, defined by its shared inlet row manifold, and its outlet row manifold, is associated with one of two top exterior discharge pipes 13 or 23, for the output (retentate) flow of that row. For maximum efficiency, and to allow for the best configuration and minimal piping, rows that connect through manifold 11 (inlet row manifolds 5, 7, 9) connect to pipe 30, which connects to external discharge pipe 23, while rows that connect through pipe 2 to inlet row manifolds 6, 8, 10 ultimately discharge into external pipe 13. The routing of process flows in this way facilitates the use of valves 12, 20, and 4 to switch from a parallel configuration to a series configuration.

While not absolutely necessary for its operation, it is best to alternate rows, with regard to connection to the various external pipes 2, 11, 13, 23, to simplify the manufacture. This arrangement maximizes the distance between piping lines from these external conduits, to the various inlet/outlet row manifolds, so that welded or screw attachments can be easily constructed with adequate spacing, while allowing the rows of modules to be closely packed together.

The permeate stream from each module in the system simply vents into the system enclosure (not shown), and out through the top port 22, with the aid of a vent fan. The enclosure must also allow for a compressed air port and a retentate port exiting the enclosure. The enclosure protects the system from the environment and allows for the permeate stream from the modules to be controlled at the top vent.

In summary, it is apparent that the plurality of valves, pipes, manifolds and ports together comprise means for arranging the set of modules in one of two configurations, namely a first configuration in which the modules are effectively configured in parallel, and a second configuration in which the modules are divided into two groups configured in series.

The valving to switch the system from operating in parallel to operating in series will ideally be in the enclosure, but the control handles can be positioned outside the enclosure to facilitate the switching between parallel and series configurations.

Figure 4:
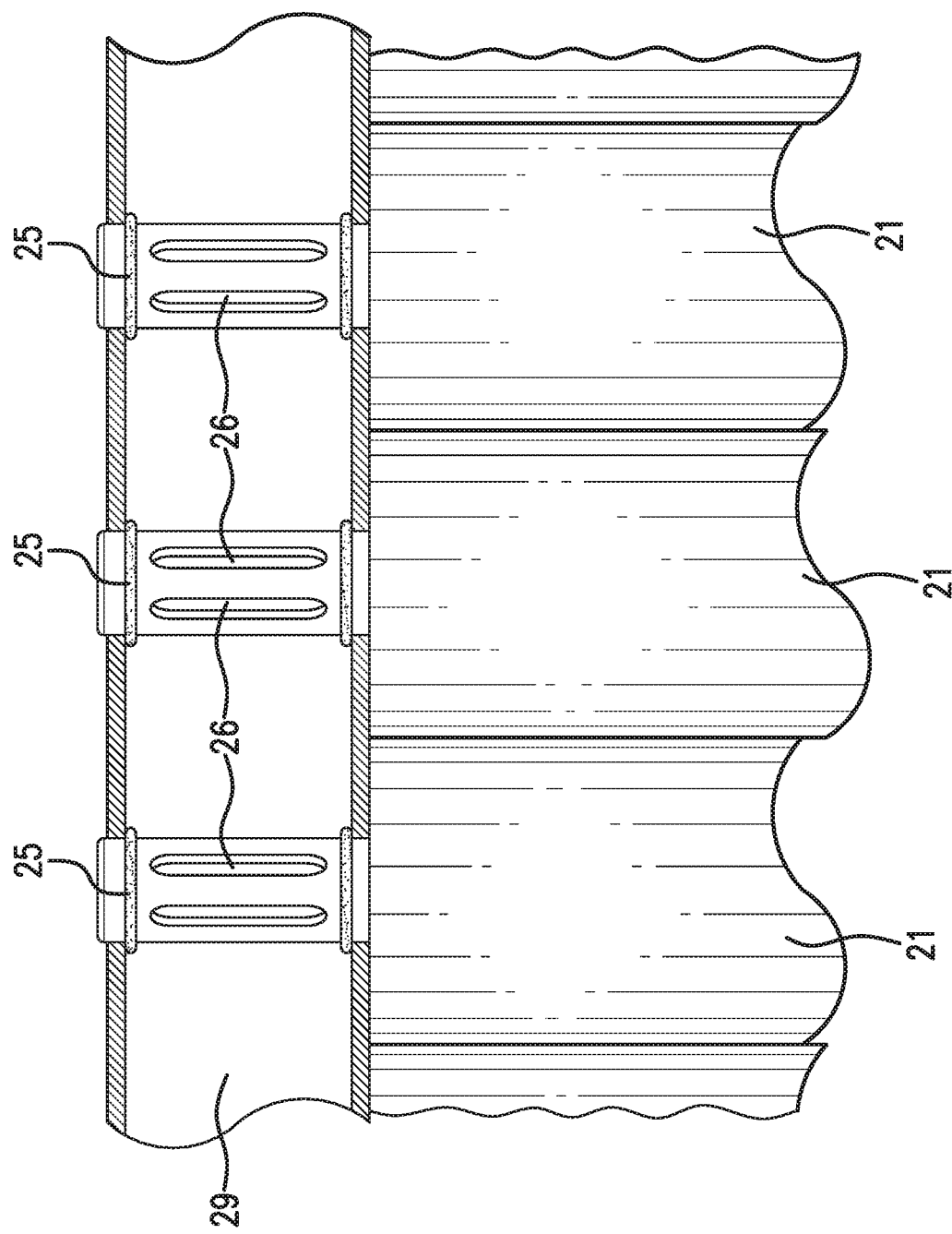
FIG. 4 provides a detail of the construction of the device of the present invention, showing the connection of the membrane modules to a manifold.

FIG. 4 shows the connection between the modules 21 and the inlet or outlet row manifolds. FIG. 4 shows one such manifold 29, which is essentially a conduit for gas. The longitudinal axis of the manifold is perpendicular to the longitudinal axes of the modules, as is apparent in the figure. Gas flowing between the modules and the manifolds flows through inlet or outlet pipes 25 which are sealed by O-rings. The inlet and outlet pipes extend into the manifolds, and are affixed to the manifolds. The inlet and outlet piping from the modules has slots 26 that allow passage of gas into or out of the module. This allows for simple assembly of modules for the compact arrangement.

Gas can therefore flow into a module by flowing through the slots of an inlet pipe, and then into the module. Gas can flow out of a module by flowing into an outlet pipe, similar to an inlet pipe, then through the slots of the outlet pipe, and into an outlet manifold.

The slotted inlet pipes do not occupy the entire cross-section of the manifold conduit, so that some gas can flow past a particular slotted pipe and continue towards the next slotted pipe.

In an alternative embodiment, one may substitute the set of three two-way valves used to control the flow pattern in the system to one three-way valve and one two-way valve. This arrangement would require the use of a three-way valve in place of either valves 12 and 4, or to replace the combination of valves 12 and 20. Depending on this choice, either valve 4 or valve 20 would remain as a two-way valve. This alternative would change the piping layouts as shown in the figures.

FIGS. 5A-5C show an alternative embodiment which permits one or more modules to be isolated from the system.

It is sometimes desired to remove one or more modules from the system, because one may not need the full capacity of the set of modules for a particular application. The process of removing one or more modules from the system is known as "turndown".

Alternatively, it is sometimes necessary to remove a module from the system because the module may have become damaged in use. It is desirable to remove a defective module without affecting the other modules. Thus, it is important to be able to isolate the defective module temporarily, and to operate the system without contamination from the defective module.

To remove a module from the system, one must close off both its inlet and its outlet. A device for doing so is shown in FIGS. 5A-5C.

FIG. 5A shows slotted pipe 40, which is similar to the slotted pipes shown in FIG. 4, insofar as it has slots 41. However, the device of FIG. 5A also includes plunger 27 which includes a threaded shank 42. The plunger can be screwed into, or out of, the slotted pipe 41. The plunger could alternatively be constructed without threads, and could be installed by friction, as shown in FIGS. 5B and 5C.

FIG. 5B shows a slotted pipe 40 in which a plunger 27 has been inserted, the plunger being in a position to block the flow of gas into or out of a module, which is not shown in the figure but assumed to be on the left side. FIG. 5C shows the plunger in an open position, wherein gas flowing into slots 41 can flow into the module, not shown but also assumed to be on the left side of the figure. Plungers are provided for the pipes on both inlet and outlet ends of the module, so any module can be easily isolated from the system by moving the plungers on both sides to their closed positions.

In the closed position, the plunger 27 blocks the passage of gas with the aid of a seal 45 installed inside the slotted pipe 40. In the open position, the plunger is moved away from the seal, thereby allowing gas to flow through the slots.

The mechanism used to isolate a module from gas flow need not be a threaded plunger, as shown in FIG. 5. Other possible mechanisms include, but are not limited to, a pneumatically operated piston that engages with the plunger seal, an aperture that can be opened or closed to prevent flow through the slotted pipe, or a sleeve that can be positioned to cover the slots directly. All of these alternatives should be considered as means for selectively blocking gas flow into, or out of, the pipes.

Figure 6:
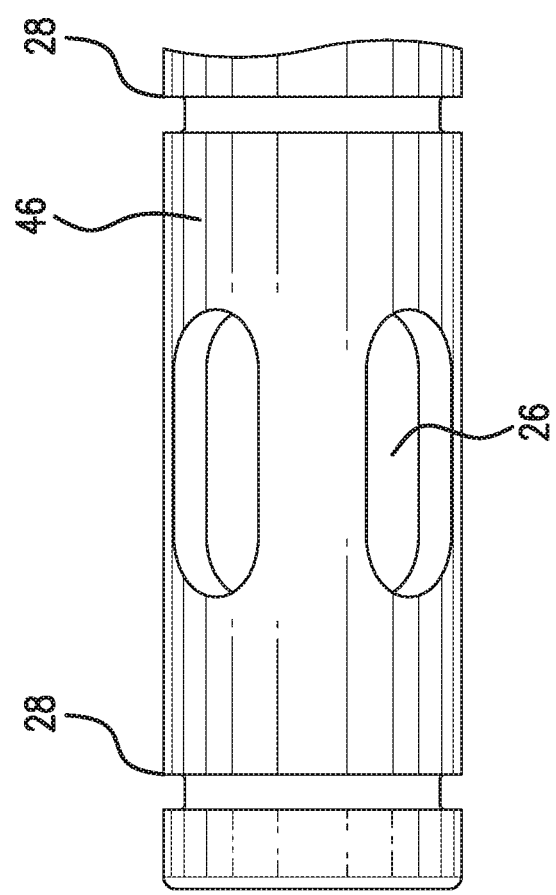
FIG. 6 provides an elevational view of a slotted pipe suitable for connection to a module, according to the present invention.

FIG. 6 shows inlet or outlet pipe 46 having slots 26. The pipe 46 has grooves 28 for installation of seals.

Figure 7:
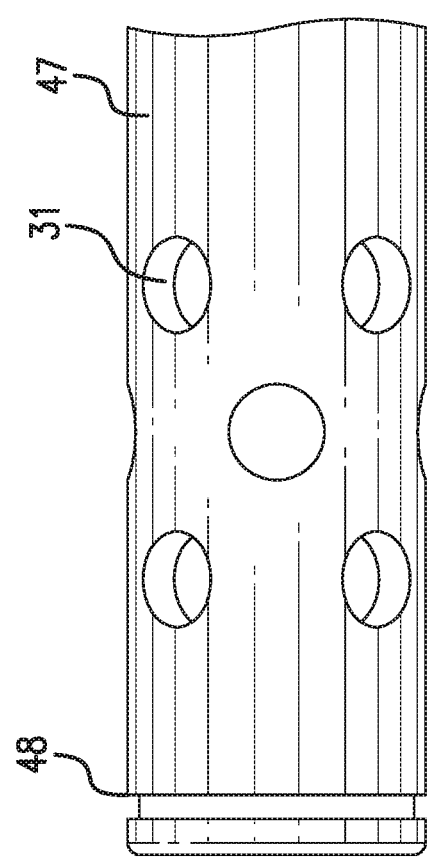
FIG. 7 provides an elevational view, similar to that of FIG. 6, but in which the slots are replaced by circular holes.

The openings in the inlet and outlet pipes need not necessarily be slots. Another alternative is shown in FIG. 7, in which pipe 47 has circular holes 31, as well as groove 48 for installation of a lock ring. Gas may enter or leave the pipe 47 through the holes, which have the same purpose as the slots. The openings in the pipe may be formed in other ways. For example, one could provide a combination of holes and slots, or one could use openings having other shapes. Also, the manner in which the pipe is sealed and held in place can be altered as appropriate.

Figure 8A:
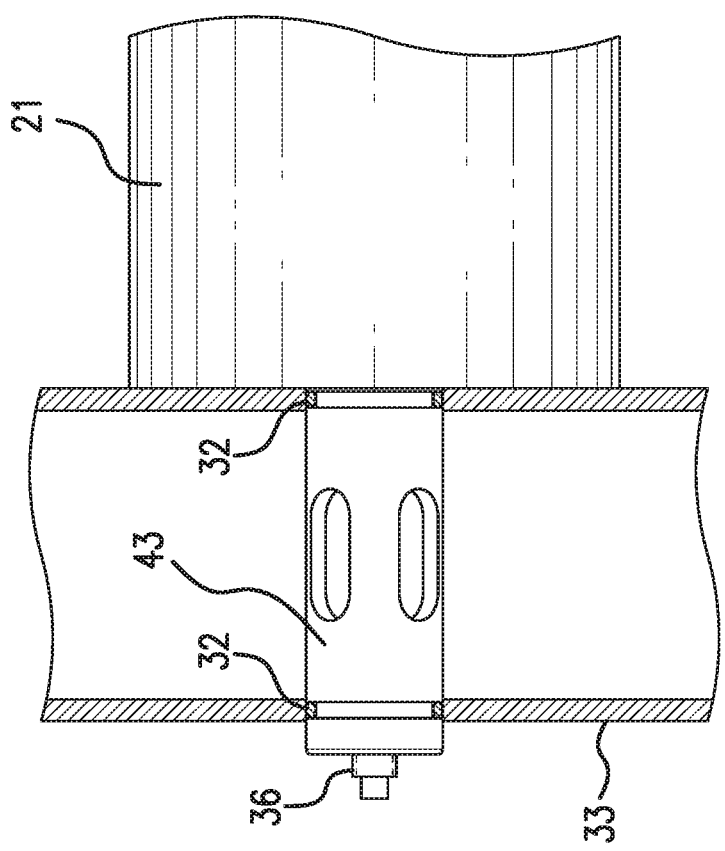
FIG. 8A provides an elevational view, partly in cross-section, and in fragmentary form, showing manifolds on either end of a module, with slotted pipes connected at either end.

FIG. 8A shows a module with inlet/outlet manifolds on either end, and also shows slotted pipes and plungers. Specifically, module 21 is flanked by manifolds 33 and 35. Either manifold could be the inlet manifold, and the remaining manifold would be the outlet manifold. The slotted pipes 43 and 44 are connected to the manifolds by a lock ring, or other means of attachment. The manifold is sealed by external seals 32. Plunger 36 allows or blocks gas flow to or from the module, as described earlier. The same components are present on the opposite ends of the module.

Figure 8B:
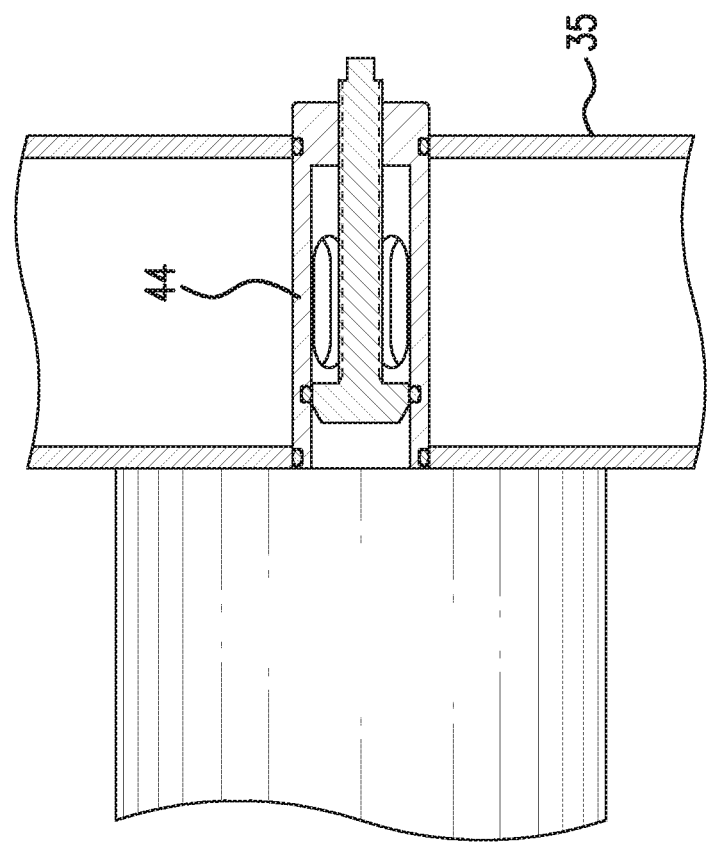
FIG. 8B provides a view similar to that of FIG. 8A, in which the slotted pipes are opened or closed with plungers.
Figure 8B:
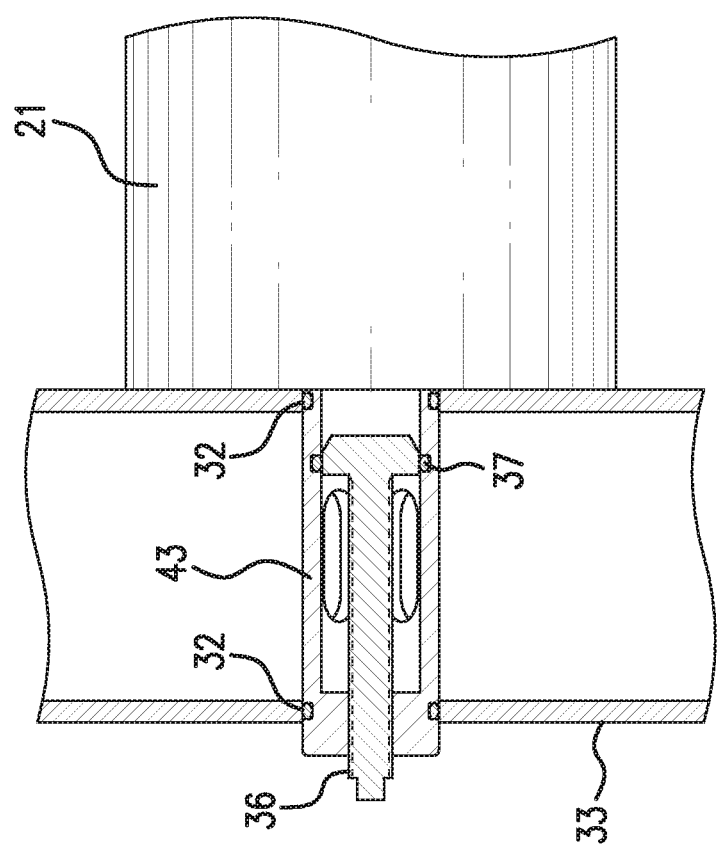

FIG. 8B is similar to FIG. 8A, except that it explicitly shows the plungers. As shown in FIG. 8B, plunger 36 includes plunger seals 37. When the plunger on the left-hand side is moved all the way to the right, and when the plunger on the right-hand side is moved all the way to the left, no gas can flow into or out of the module, and the module is isolated from the system. When the plungers are moved in the respective opposite directions, the modules are again connected to the system.

FIG. 9 illustrates another variation, wherein the inlet or outlet pipe 50 has circular holes 51 instead of slots. The figure shows seals 32 which seal the joint between the pipe 50 and the wall of the manifold 33. The figure also shows lock ring 34, which affixes the pipe 50 to the manifold. The lock ring can be threaded, in which case it screws onto the pipe in the manner of a threaded nut, or it can be a snap ring or the like. The lock ring serves to hold the inlet or outlet pipe in position within the manifold.

The invention therefore includes the method of selectively blocking gas flow into, or out of, a module. When it is desired to remove a module from the system, one blocks the flow of gas through the openings in the pipes at the inlet and outlet ends of the module. The flow is blocked by moving a plunger as described above, or by actuating any of the equivalent means of blocking gas flow, also as discussed above.

The feature wherein the modules are connected to the manifolds through slotted or perforated pipes, as shown in FIGS. 4, 8A, 8B, and 9 is independent of the feature wherein the modules can be easily switched between series and parallel configurations. That is, the slotted or perforated pipe connections can be used with systems which are not switchable between series and parallel configurations, or with systems which do have the latter characteristic.

The same applies to the "turndown" feature. That is, the arrangements shown for isolating one or more modules from the system are independent of the feature wherein the configuration can be switched between series and parallel. Thus, one can use the turndown feature in any system having multiple gas separation modules, whether or not their configuration can be quickly changed.

The present invention can be used in either horizontal or vertical arrangements. That is, the orientation of the modules does not affect the operation of the invention.

The improvements represented by FIGS. 4-9 are not limited to use with a system having a plurality of modules. The same structures can be used in a system having only one module. Just as in the case of multiple modules, the present invention, when applied to a single-module system, provides slotted or perforated pipes connected at each end of the module, and the pipes are inserted into, and affixed to, inlet and outlet manifolds which convey gas to or from either end of the module.

More specifically, in a single-module system, gas flows into an inlet manifold, then through the slots or perforations of an inlet pipe, and into an inlet end of the module. Gas exits the module at its outlet end, and flows into the outlet pipe connected at the outlet end, then through the slots or holes of the outlet pipe, and into an outlet manifold.

In a single-module system, one can also provide plungers, or equivalent means, similar to those described above, for temporarily blocking and unblocking the flow of gas to and from the module when necessary.

The invention can be modified in other ways, without departing from the basic concept. For example, one could arrange the modules in groups having unequal numbers. The sets of modules could be interleaved, as shown in the examples described above, or non-interleaved, or one could provide some other pattern of interleaving and non-interleaving.

In the embodiment wherein two groups of modules are effectively connected in series, the numbers of modules in each group, in the example discussed above, were equal, or nearly equal. But in practice, these numbers of modules in each group could be different, i.e. the set of modules need not be divided exactly in half. These and other modifications will be apparent to those skilled in the art, and should be considered within the spirit and scope of the following claims.

What is claimed is:

1. Apparatus for providing fluid connections between a manifold and a plurality of gas separation modules, comprising:
   a) a plurality of gas separation modules, arranged in a row,
   b) each module having an inlet end and an outlet end, wherein the inlet and outlet ends of each module are connected to pipes having openings,
   c) inlet and outlet manifolds, disposed along the inlet and outlet ends, respectively, of the modules, the inlet and outlet manifolds comprising conduits for gas entering or leaving a module, the manifolds having a longitudinal axis, and the modules having a longitudinal axis, and wherein the manifolds are arranged such that their longitudinal axes are perpendicular to the longitudinal axes of the modules,
   wherein the pipes extend into, and are connected to, a manifold, to permit gas to flow between the manifold and the modules by flowing through the openings,
   wherein the openings in the pipes comprise slots.

2. The apparatus of claim 1, further comprising means for selectively blocking gas flow into, or out of, the pipes.

3. The apparatus of claim 2, wherein the blocking means comprises a plunger which is slidable between an open position and a closed position.

4. The apparatus of claim 2, wherein the blocking means comprises a plunger having a threaded shank, wherein the plunger can be screwed into, or out of, the pipe.

5. The apparatus of claim 3, wherein there is a plunger associated with each of the pipes, at both the inlet and outlet ends of the modules.

6. The apparatus of claim 1, wherein at least one of the pipes are connected to the manifold by a lock ring.

7. The apparatus of claim 1, further comprising a plurality of conduits and valves which are connected to the modules,
   wherein, in a first configuration of the valves, a feed gas is directed into all of the modules, wherein the modules are connected in parallel, and
   wherein, in a second configuration of the valves, a feed gas is directed into a first group of modules, the first group comprising fewer than all of the modules, and then into a second group of modules, the second group comprising modules not belonging to the first group, wherein the first and second groups of modules are effectively connected in series.

8. The apparatus of claim 7, wherein there are three valves, each valve having two positions, one position being an open position and a second position being a closed position.

9. A method for selectively isolating a gas separation module in a system comprising a plurality of gas separation modules arranged in a row, wherein each module has an inlet end and an outlet end, wherein the inlet and outlet ends of each module are connected to pipes having openings, wherein the system includes inlet and outlet manifolds, disposed along the inlet ends and the outlet ends of the modules, the inlet and outlet manifolds comprising conduits for gas entering or leaving a module, the manifolds having a longitudinal axis, and the modules having a longitudinal axis, and wherein the manifolds are arranged such that their longitudinal axes are perpendicular to the longitudinal axes of the modules, and wherein each pipes extends into, and is connected to, a manifold, to permit gas to flow between the manifold and the modules by flowing through the openings, the method comprising blocking the openings of selected pipes, so as to isolate a selected module from the system, wherein the blocking step is performed by moving a plunger within at least one of the pipes, so as to block a flow of gas through the openings of said one of the pipes.

10. The method of claim 9, further comprising moving the plunger so as to unblock the openings of said one of the pipes, so as to reconnect the module to the system.

11. The method of claim 9, wherein the system includes a plurality of conduits and valves which are connected to the modules, wherein, in a first configuration of the valves, a feed gas is directed into all of the modules, wherein the modules are connected in parallel, and wherein, in a second configuration of the valves, a feed gas is directed into a first group of modules, the first group comprising fewer than all of the modules, and then into a second group of modules, the second group comprising all modules not belonging to the first group, wherein the first and second groups of modules are effectively connected in series, the method further comprising placing the valves in the first position when a product of moderate purity is desired, and placing the valves in the second position when a product of higher purity is desired.

12. The method of claim 11, wherein there are three valves, each valve having two positions, one position being an open position and a second position being a closed position, and wherein the placing steps comprise adjusting positions of the three valves.

13. Apparatus for providing fluid connections between a manifold and a plurality of gas separation modules, comprising:
a) a plurality of gas separation modules, each module having an inlet end and an outlet end,
b) a plurality of pipes, each pipe having openings, each pipe being connected to one of said inlet or outlet ends of a module,
c) inlet and outlet manifolds, the manifolds comprising conduits for gas flow, the inlet and outlet manifolds being positioned in a vicinity of the inlet and outlet ends of the modules, respectively,
wherein the pipes extend into, and are affixed to, the manifolds,
and wherein gas can flow between a manifold and a module by flowing through the openings in one of the pipes,
wherein the openings in the pipes comprise slots.

14. The apparatus of claim 13, further comprising means for selectively blocking gas flow into, or out of, the pipes.

15. The apparatus of claim 14, wherein the blocking means comprises a plunger which is movable between an open position and a closed position.

16. The apparatus of claim 15, further comprising a plurality of conduits and valves which are connected to the modules, wherein, in a first configuration of the valves, a feed gas is directed into all of the modules, wherein the modules are connected in parallel, and wherein, in a second configuration of the valves, a feed gas is directed into a first group of modules, the first group comprising fewer than all of the modules, and then into a second group of modules, the second group comprising modules not belonging to the first group, wherein the first and second groups of modules are effectively connected in series.

17. Apparatus for providing fluid connections between a manifold and a gas separation module, comprising:
a) a gas separation module, having an inlet end and an outlet end,
b) inlet and outlet pipes, connected respectively to the inlet end and the outlet end of the module, the inlet and outlet pipes having openings,
c) inlet and outlet manifolds, the manifolds comprising conduits for gas flow, the inlet and outlet manifolds being positioned in a vicinity of the inlet and outlet ends of the module, respectively,
wherein the pipes extend into the manifolds and are affixed to the manifolds,
and wherein gas can flow between a manifold and the module by flowing through the openings in one of the pipes,
wherein the openings in the pipes comprise slots.

18. The apparatus of claim 17, further comprising means for blocking gas flow into, or out of, the pipes.

19. The apparatus of claim 18, wherein the blocking means comprises a plunger which is movable between an open position and a closed position.

20. Apparatus for providing fluid connections between a manifold and a plurality of gas separation modules, comprising:
a) a plurality of gas separation modules, arranged in a row,
b) each module having an inlet end and an outlet end, wherein the inlet and outlet ends of each module are connected to pipes having openings,
c) inlet and outlet manifolds, disposed along the inlet and outlet ends, respectively, of the modules, the inlet and outlet manifolds comprising conduits for gas entering or leaving a module, the manifolds having a longitudinal axis, and the modules having a longitudinal axis, and wherein the manifolds are arranged such that their longitudinal axes are perpendicular to the longitudinal axes of the modules,
wherein the pipes extend into, and are connected to, a manifold, to permit gas to flow between the manifold and the modules by flowing through the openings,
further comprising means for selectively blocking gas flow into, or out of, the pipes,
wherein the blocking means comprises a plunger having a threaded shank, wherein the plunger can be screwed into, or out of, the pipe.

21. Apparatus for providing fluid connections between a manifold and a plurality of gas separation modules, comprising:
a) a plurality of gas separation modules, arranged in a row,
b) each module having an inlet end and an outlet end, wherein the inlet and outlet ends of each module are connected to pipes having openings,
c) inlet and outlet manifolds, disposed along the inlet and outlet ends, respectively, of the modules, the inlet and outlet manifolds comprising conduits for gas entering or leaving a module, the manifolds having a longitudinal axis, and the modules having a longitudinal axis, and wherein the manifolds are arranged such that their longitudinal axes are perpendicular to the longitudinal axes of the modules, wherein the pipes extend into, and are connected to, a manifold, to permit gas to flow between the manifold and the modules by flowing through the openings, further comprising means for selectively blocking gas flow into, or out of, the pipes, wherein the blocking means comprises a plunger which is slidable between an open position and a closed position, wherein there is a plunger associated with each of the pipes, at both the inlet and outlet ends of the modules.

* * * * *